(12) United States Patent
Cella

(10) Patent No.: US 11,820,713 B1
(45) Date of Patent: Nov. 21, 2023

(54) METHOD OF MANUFACTURING A GLAZED CERAMIC TILE WITH AT LEAST ONE GROOVE AND A TILE PRODUCED USING SUCH A METHOD

(71) Applicant: Limelight Tile & Ceramics, LLC, Pittsburgh, PA (US)

(72) Inventor: Donald Joseph Cella, Pittsburgh, PA (US)

(73) Assignee: Limelight Tile & Ceramics LLC, Pittsburgh, PA (US)

( * ) Notice: Subject to any disclaimer, the term of this patent is extended or adjusted under 35 U.S.C. 154(b) by 0 days.

(21) Appl. No.: 17/858,747

(22) Filed: Jul. 6, 2022

(51) Int. Cl.
 *C04B 33/00* (2006.01)
 *C04B 33/34* (2006.01)
 *C04B 33/30* (2006.01)
 *B28B 11/08* (2006.01)
 *C04B 33/04* (2006.01)
 *B28B 11/04* (2006.01)

(52) U.S. Cl.
 CPC ............ *C04B 33/34* (2013.01); *B28B 11/041* (2013.01); *B28B 11/044* (2013.01); *B28B 11/0863* (2013.01); *C04B 33/04* (2013.01); *C04B 33/30* (2013.01); *C04B 2235/349* (2013.01); *C04B 2235/945* (2013.01)

(58) Field of Classification Search
 CPC .............................. C04B 33/34; B28B 11/041
 See application file for complete search history.

(56) References Cited

U.S. PATENT DOCUMENTS

| | | | |
|---|---|---|---|
| 2012/0317913 A1* | 12/2012 | Esquivel | B28D 1/30 52/316 |
| 2021/0040746 A1 | 2/2021 | Confetti | |
| 2021/0285236 A1 | 9/2021 | Cesana et al. | |

FOREIGN PATENT DOCUMENTS

| | | | |
|---|---|---|---|
| CN | 101028725 A | * | 9/2007 |
| CN | 108204092 A | | 6/2018 |
| GB | 455470 | | 10/1936 |
| GB | 2151277 B | | 2/1987 |
| WO | 0046044 A1 | | 8/2000 |
| WO | 02077387 A1 | | 10/2002 |

OTHER PUBLICATIONS

"Calvin" https://www.youtube.com/watch?v=QNLLiQcfQck, Youtube video titled "Fake grout lines on porcelain large format [tile]" (Year: 2020).*
JM_ArtTOWN (NPL 2020 ), https://www.youtube.com/watch?v=2xamUGuFB94 (Year: 2020).*
Ceramics Dictionary (NPL 2012 ), https://web.archive.org/web/20120313090326/http://ceramicdictionary.com/en/i/ (Year: 2012).*
MadeHow (NPL 2006), https://web.archive.org/web/20060326034533/http://www.madehow.com/Volume-1/Ceramic-Tile.html (Year: 2006).*

* cited by examiner

*Primary Examiner* — Nicholas R Krasnow
(74) *Attorney, Agent, or Firm* — THE WEBB LAW FIRM

(57) ABSTRACT

A process for manufacturing glazed ceramic tiles from a substrate of green clay having at least one groove extending within the surface of the tile, wherein the groove is imparted to the tile while the substrate is still green clay before the substrate is bisque or glaze fired. A tile fabricated using this process is also part of the invention.

12 Claims, 6 Drawing Sheets

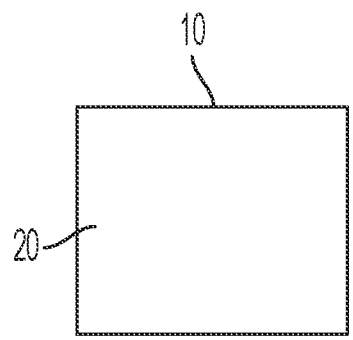
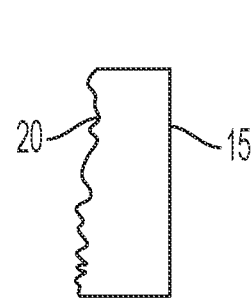
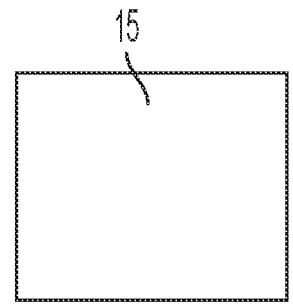
FIG. 1A     FIG. 1B     FIG. 1C
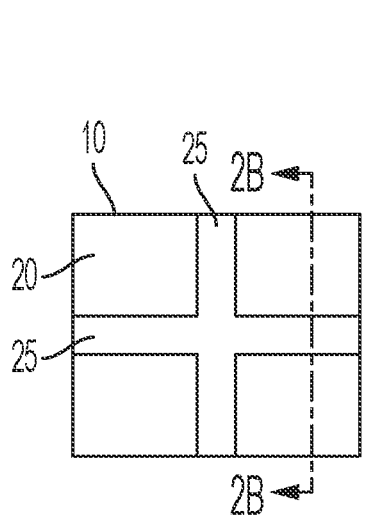
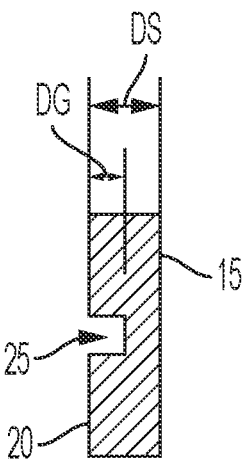
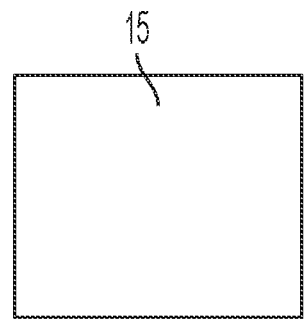
FIG. 2A     FIG. 2B     FIG. 2C

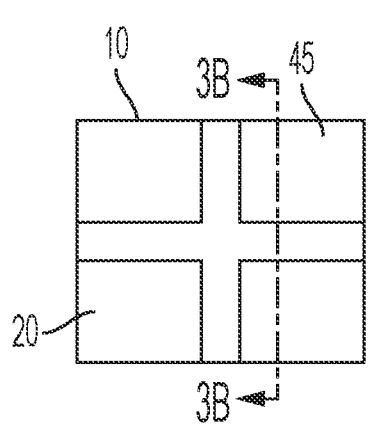 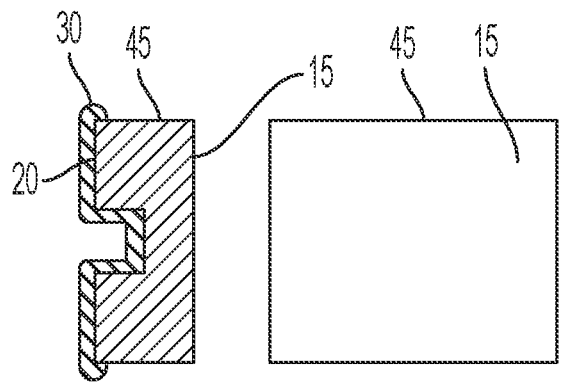
FIG. 3A  FIG. 3B  FIG. 3C
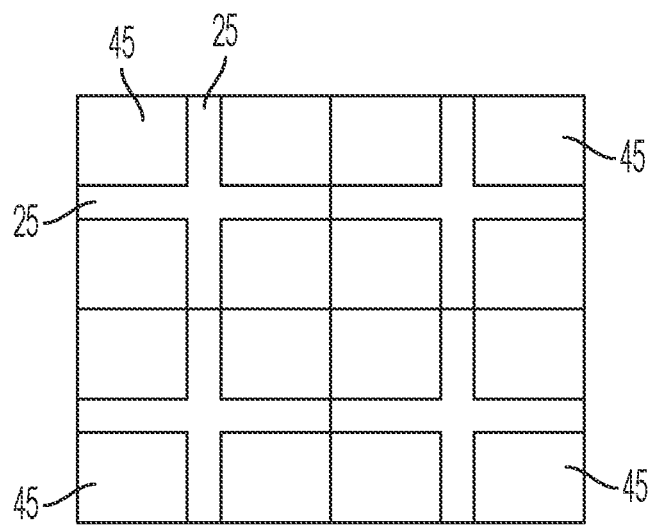
FIG. 4

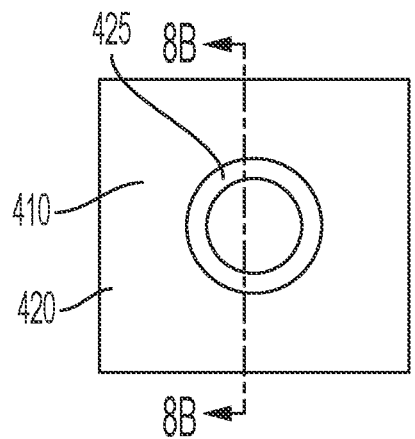
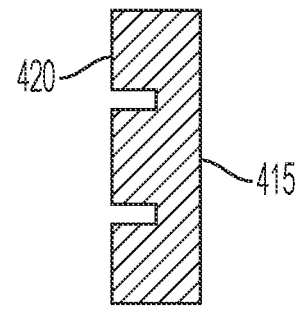
FIG. 8A  FIG. 8B
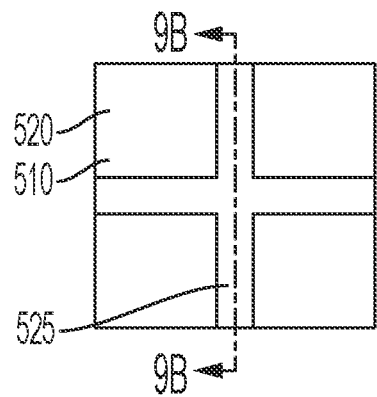
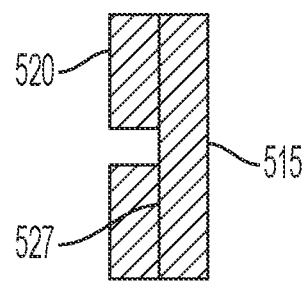
FIG. 9A  FIG. 9B
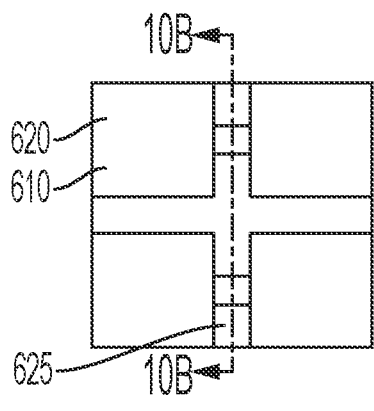
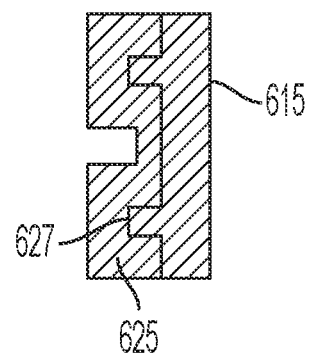
FIG. 10A  FIG. 10B

METHOD OF MANUFACTURING A GLAZED CERAMIC TILE WITH AT LEAST ONE GROOVE AND A TILE PRODUCED USING SUCH A METHOD

BACKGROUND OF THE INVENTION

Field of the Invention

The invention relates to the manufacturing of a glazed ceramic tile and, more particularly, to the manufacturing of a glazed ceramic tile having at least one groove therein.

Description of Related Art

Making glazed ceramic tiles involves multiple steps beginning with manipulating green clay and ending with a glaze firing which converts the clay to ceramic.

The process begins with green clay, which may be slip clay or plastic clay. Slip clay is the wettest form of clay that has the highest moisture content. Slip clay may be used in an injection molding process where the low viscosity is conducive to forming the clay. Plastic clay is a drier form of clay where some of the moisture has evaporated. Plastic clay can be manipulated into different forms either by hand or using tools. In the plastic stage, the clay is flexible and can be molded into any form or shape desired. In either instance, whether using slip clay or plastic clay, the clay may be formed as desired. The shaped clay is referred to as a substrate.

Once the clay substrate is formed, in general, the substrate is allowed to dry either in ambient conditions or within a drying oven with a temperature of up to 212° F. such that the moisture is largely removed. At this point, the substrate is dry but is extremely fragile.

Typically, the next step for making ceramic is to subject the dry clay substrate to further heat referred to as a bisque firing. Here, the substrate will be taken to a temperature of at least 900° F. in an oven and as a result of a bisque firing the material is no longer clay but is transformed into ceramic. However, the intention of a bisque firing is not only to convert the clay to ceramic but also to heat the ceramic to a temperature where it is still porous and absorbent in preparation for the application of glaze. As used herein, the phrase "bisque firing" may be used as a verb indicating that the green clay is subjected to temperatures that would impart to the green clay a bisque firing.

Thereafter, glaze is applied to the desired surface(s) and the substrate is subjected to the final stage of processing, which is glaze firing. At this point, the substrate is heated to temperatures greater than 1800° F. such that the substrate is vitrified and the glaze is melted onto the surface of the substrate. As used herein, the phrase "glaze firing" may be used as a verb indicating that the ceramic substrate and glaze are subjected to temperatures that would impart to the ceramic substrate a glaze firing.

Depending upon the desired outcome, it is possible that once the clay is dried, glaze may be applied without the step of bisque firing and thereafter the substrate and glaze may be subjected to glaze firing.

Furthermore, it is possible to avoid the drying step entirely and to subject the green clay substrate to bisque firing, applying a layer of glaze, and then glaze firing the substrate and glaze.

One of the desirable features of decorating a surface with ceramic tiles is the ability to provide different patterns by, among other things, providing spaces between the tiles. These spaces are generally filled with grout such that the grout pattern becomes part of the decorative appearance. One of the most common ways to achieve this appearance is to provide a number of separate and discrete tiles, positioned adjacent to but spaced from one another, mounted upon a flexible mesh backing. The flexible mesh backing and attached tiles are secured to a surface, such as a floor or a wall. This is typically done using adhesive, and then the space between the tiles is filled with grout.

However, manufacturing these tiles and securing them to mesh backing is costly and requires a substantial amount of time and labor. Also, tile installers often find mesh mounted tiles difficult to work with due to spacing being off or the mesh failing.

A method is needed that will provide a tile arrangement with the same decorative appearance of multiple tiles spaced apart on a mesh backing but without the need to produce multiple tiles to achieve this appearance.

SUMMARY OF THE INVENTION

One embodiment of the invention is directed to a method of manufacturing a glazed ceramic tile with at least one groove. The method comprises the steps of:
  a) providing a substrate of green clay wherein the substrate has a first surface that is flat and planar and an opposing second surface;
  b) imparting at least one groove within the second surface of the substrate;
  c) removing moisture from the substrate;
  d) applying a layer of glaze upon the second surface; and
  e) glaze firing the substrate wherein the substrate is vitrified into ceramic and the glaze is melted onto the second surface of the substrate.

Another embodiment is directed to a method of manufacturing a glazed ceramic tile with at least one groove by machining comprising the steps of:
  a) providing a substrate of green clay wherein the substrate has a first surface that is flat and planar and an opposing second surface;
  b) drying the green clay through exposure to air or through heating within an oven to a temperature of up to 212° F. to remove moisture from the substrate;
  c) imparting at least one groove within the second surface of the substrate by machining the substrate to produce at least one groove;
  d) applying a layer of glaze over the second surface; and
  e) glaze firing the substrate with the glaze thereupon wherein the substrate is vitrified into ceramic and the glaze is melted onto the second surface of the substrate.

Yet another embodiment is directed to a method of manufacturing glazed ceramic tile with at least one groove by injection molding, pressing, stamping or machining comprising the steps of:
  a) providing a substrate of green clay wherein the substrate has a first surface that is flat and planar and an opposing second surface;
  b) imparting at least one groove within the second surface of the substrate;
  c) removing moisture from the substrate;
  d) applying a layer of glaze over the second surface; and
  e) glaze firing the substrate with the glaze thereupon wherein the substrate is vitrified into ceramic and the glaze is melted onto the second surface of the substrate.

BRIEF DESCRIPTION OF THE DRAWINGS

FIG. 1A is a top view of a green clay substrate;
FIG. 1B is a side view of the substrate of FIG. 1A;

FIG. 1C is a bottom view of the substrate of FIG. 1A;

FIG. 2A is a top view of a green clay substrate or a ceramic substrate in accordance with the subject invention wherein a groove extends completely across the width of the substrate;

FIG. 2B is a cross-sectional view of the substrate taken along the arrows "2B-2B" of FIG. 2A;

FIG. 2C is a bottom view of the substrate of FIG. 2A;

FIG. 3A is a top view of a green clay substrate or a ceramic substrate in accordance with the subject invention wherein a groove extends completely across the width of the substrate with glaze applied thereupon;

FIG. 3B is a side view of the substrate of FIG. 3A;

FIG. 3C is a bottom view of the substrate of FIG. 3A;

FIG. 4 is a top view of individual tiles of the subject invention placed adjacent to one another to illustrate how the subject invention provides the appearance of multiple tiles;

FIG. 8A is a top view of a green clay substrate or a ceramic substrate in accordance with the subject invention wherein a groove is internal relative to the perimeter of the substrate;

FIG. 8B is a cross-sectional view of the substrate taken along the arrows "8B-8B" of FIG. 8A;

FIG. 9A is a top view of a green clay substrate or a ceramic substrate in accordance with the subject invention wherein a groove has a uniform depth;

FIG. 9B is a cross-sectional view of the substrate taken along the arrows "9B-9B" of FIG. 9A;

FIG. 10A a is a top view of a green clay substrate or a ceramic substrate in accordance with the subject invention wherein the groove has a non-uniform depth;

FIG. 10B is a cross-sectional view of the substrate taken along the arrows "10B-10B" of FIG. 10A.

DESCRIPTION OF THE INVENTION

Figure 5:
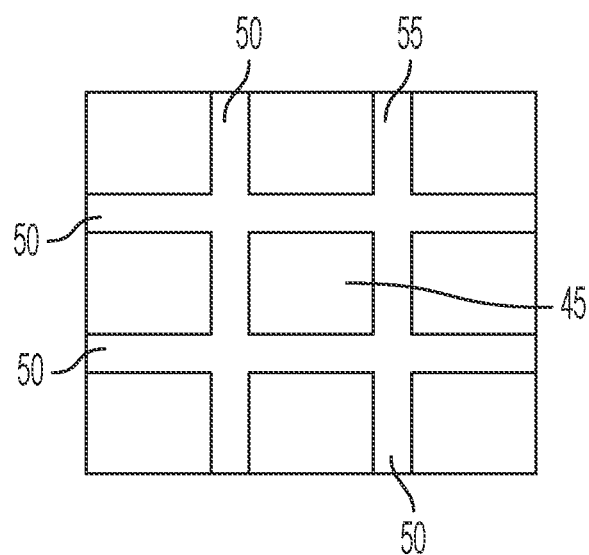
FIG. 5 is a top view of a single green substrate or ceramic substrate with multiple grooves.

For purposes of the description hereinafter, the terms "upper", "lower", "right", "left", "vertical", "horizontal", "top", "bottom", "lateral", "longitudinal," and derivatives thereof shall relate to the invention as it is oriented in the drawing figures. However, it is to be understood that the invention may assume various alternative variations, except where expressly specified to the contrary. It is also to be understood that the specific devices illustrated in the attached drawings and described in the following specification are simply exemplary embodiments of the invention. Hence, specific dimensions and other physical characteristics related to the embodiments disclosed herein are not to be considered as limiting.

FIGS. 1A-1C illustrate a substrate 10 of green clay. The substrate 10 has a first surface 15 that is flat and planar and an opposing second surface 20. As illustrated in FIGS. 2A-2C, at least one groove 25 is imparted within the second surface 20 of the substrate 10. It should be noted that the second surface 20 does not have to be flat and planar and may have any number of different profiles, including textured and/or wavy. FIG. 1B, for example, shows the second surface 20 as textured.

As further illustrated in FIGS. 3A-3C, a layer 30 of glaze is applied upon the second surface 20. The substrate 10 and the layer 30 of glaze are then glaze fired such that the substrate 10 is vitrified and the layer 30 of glaze is melted onto the second surface 20 of the substrate 10 to form a finished glazed ceramic product 45.

To those skilled in the art, the term vitrified has a different meaning for low-fire clay and for medium/high-fire clay. Low-fire clay never fully becomes vitreous, but upon sufficient heating it is taken to its full maturity. Medium/high-fire clay upon sufficient heating does become vitreous. For purposes of the discussion herein, the term vitrified will be used to identify both heating low-fire clay to its full maturity and medium/high-fire clay to become vitreous.

One of the uses of this product is for glazed ceramic tile, and the discussion herein will be directed to such glazed ceramic tile 45 with the understanding that there may be other products for which this manufacturing process may be used.

Returning to FIGS. 2A-2C, there are two grooves 25 imparted to the substrate 10, and these grooves 25 are perpendicular to each other and symmetric such that, as illustrated in FIG. 4, multiple tiles 45 may be placed adjacent to and abut one another such that, unlike the prior art with multiple tiles spaced upon a flexible web with gaps therebetween, there are no gaps between the tiles 45. However, the aesthetic appearance of gaps between tiles is still desirable. Therefore, the tiles 45 are arranged such that the grooves 25 of adjacent tiles 45 are aligned with each other. As a result, these grooves 25 give the illusion that there are gaps between tiles 45. Also, by adding additional grooves 50, it is possible to create the appearance of multiple tiles in a single tile 55.

Directing attention to the manufacturing process, there are different ways in which the ceramic tile may be fabricated.

In one embodiment, a dry substrate may be machined to impart at least one groove within the second surface of the substrate. In particular, with reference again to FIGS. 2A-2C, a substrate 10 of green clay is provided wherein the substrate 10 has a first surface 15 that is flat and planar and an opposing second surface 20.

The substrate 10 is dried through exposure to air or through heating with an oven to a temperature of up to 212° F. to remove moisture from the substrate 10. After drying, at least one groove 25 is imparted within the second surface 20 of the substrate 10 by machining the substrate 10 to produce the at least one groove 25. Such machining may be performed using a CNC machine with an end mill. The depth DG of the groove 25 may be up to 80% of the depth DS of the substrate 10. As seen in the FIG. 2B, the depth of the groove may be 50%. Once the groove 25 is imparted, then, with attention directed to FIG. 3B, a layer 30 of glaze maybe applied over the second surface 20. Thereafter, the substrate 10 with the layer 30 of glaze thereupon may be glaze fired wherein the substrate 10 is vitrified and the layer 30 of glaze is melted onto the second surface 20 of the substrate 10.

The range of temperatures utilized for glaze firing varies depending upon the composition of the green clay and is generally known to those skilled in the art.

It is also possible after the step of imparting at least one groove 25 within the second surface 20 of the substrate 10 but before the step of applying a layer 30 of glaze to further include a step of bisque firing the substrate 10. As previously mentioned, bisque firing the substrate 10 converts a substrate 10 to ceramic; however, it retains porosity and allows the surface of the substrate 10 to be absorbent such that the layer 30 of glaze may be absorbed into the surface of the substrate 10.

The range of temperatures utilized for bisque firing varies depending upon the composition of the green clay and is generally known to those skilled in the art.

While what has been described is machining the substrate 10 after it is been dried, it is also possible to form the grooves 25 within the substrate 10 while the substrate 10 is still relatively malleable. Under such circumstances, it is possible to impart grooves 25 into the substrate 10 through processes such as pressing, stamping, or machining when the green clay substrate 10 is in the form of plastic clay or, furthermore, using an injection molding process when the green clay is in the form of slip clay.

In particular, with respect to pressing, stamping, or machining the plastic clay, the method of manufacturing a glazed ceramic tile with at least one groove 25 comprises the steps of providing a substrate 10 of green clay wherein the substrate 10 has a first surface 15 that is flat and planar and an opposing second surface 20. At least one groove 25 is imparted within the second surface 20 of the substrate 10 by pressing, stamping, or machining. At this time, at least some moisture must be removed from the green clay of the substrate. Thereafter, a layer 30 of glaze may be applied over the second surface 20 of the substrate 10.
The substrate 10 and the layer 30 of glaze thereupon may then be glaze fired wherein the substrate 10 is vitrified and the layer 30 of glaze is melted onto the second surface 20 of the substrate 10.

The step of removing moisture may be achieved by drying the plastic clay through exposure to air or through heating within an oven to a temperature of up to 212° F.

The step of removing moisture may also be achieved by bisque firing the substrate 10. However, it should be noted that bisque firing also changes the green clay to ceramic.

Finally, it is possible to remove moisture by drying the plastic clay through exposure to air or through heating within an oven to a temperature of up to 212° F. and then further removing moisture but also converting the green clay to ceramic by bisque firing.

While what has just been discussed is forming the plastic clay using one of pressing, stamping, or machining, it is also possible for the steps of providing a substrate 10 and imparting at least one groove 25 to occur using injection molding with slip clay. Under these circumstances, the steps of providing a substrate of green clay and imparting at least one groove occur simultaneously.

However, once the substrate 10 is imparted with at least one groove 25, the process is similar to that applied to plastic clay after it is stamped, pressed, or machined as described above.

In particular, after the step of imparting the at least one groove 25 but prior to the step of applying a layer 30 of glaze, it is possible to further include the step of drying the clay through exposure to air or through heating with an oven to a temperature of up to 212° F. to remove moisture from the substrate.

It is furthermore possible after the step of drying the clay but before the step of applying a layer 30 of glaze to bisque fire the substrate 10.

Finally, it is possible after the step of imparting at least one groove 25 but before the step of applying a layer 30 of glaze to bisque fire the substrate 10.

While what has been described are different processes for manufacturing glazed ceramic tile with at least one groove, there are different forms that the at least one groove may take.

Figure 6A:
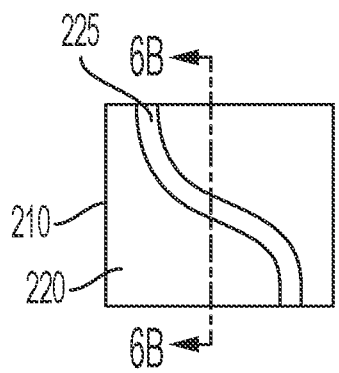
FIG. 6A is a top view of a green clay substrate or a ceramic substrate in accordance with the subject invention wherein a groove extends completely across the width of the substrate.
Figure 6B:
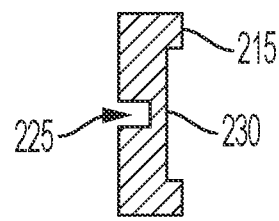
FIG. 6B is a cross-sectional view of the substrate taken along the arrows "6B-6B" of FIG. 6A.
Figure 6C:
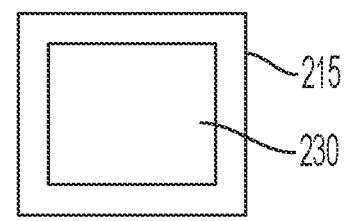
FIG. 6C is a bottom view of the substrate of FIG. 6A.

In particular, and with attention directed to FIGS. 6A-6C, the substrate 210 has a first surface 215 that is flat and planar and an opposing second surface 220, and the at least one groove 225 that is imparted within the second surface 220 of the substrate 210 may have a serpentine shape or any number of different shapes that may be desired extending across the width of the substrate 210. Furthermore, while the first surface 215 is flat and planar, it should be understood that it is also possible to impart a cavity 230 within the first surface 215 which may be done to reduce the weight or reduce the amount of material necessary to fabricate the tile.

As illustrated in FIGS. 2A-2C and FIGS. 6A-6C, the substrate 10, 210 has a perimeter and at least one groove 25, 225 extending across the entire width of the perimeter.

Figure 7A:
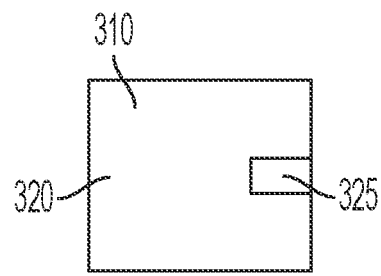
FIG. 7A is a top view of a green clay substrate or a ceramic substrate in accordance with the subject invention wherein a groove extends partially across the width of the substrate.
Figure 7B:
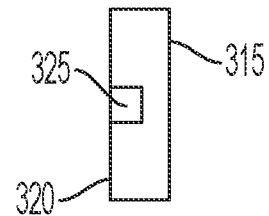
FIG. 7B is a side view of the substrate of FIG. 7A.

As further illustrated in FIGS. 7A-7B, a substrate 310 may have a first surface 315 that is flat and planar and an opposing second surface 320 with at least one groove 325 that is imparted and extends only partially across the width of the perimeter of the substrate 310.

As further illustrated in FIGS. 8A-8B, a substrate may have a first surface 415 that is flat and planar and an opposing second surface 420 with a groove 425 that is imparted within the second surface 420 of the substrate 410 that is spaced from the perimeter of the substrate 410 but does not extend to the perimeter. Such an example is illustrated by the circular groove 425.

As further illustrated in FIGS. 9A-9B, a substrate 510 may have a first surface 515 that is flat and planar and an opposing second surface 520 with at least one groove 525 imparted within the second surface 520, and the groove 525 may have a uniform depth. As illustrated from the cross-sectional view of FIG. 9B, the bottom 527 of the groove 525 has a uniform depth across the width of the substrate 510.

However, as further illustrated in FIGS. 10A-10B, a substrate 610 may have a first surface 615 which is flat and planar and an opposing second surface 620 with at least one groove 625 imparted into the second surface 620. The at least one groove 625 may have a non-uniform depth which, for example, may include protrusions 627 that may be introduced for additional structural integrity to the substrate.

Figure 11:
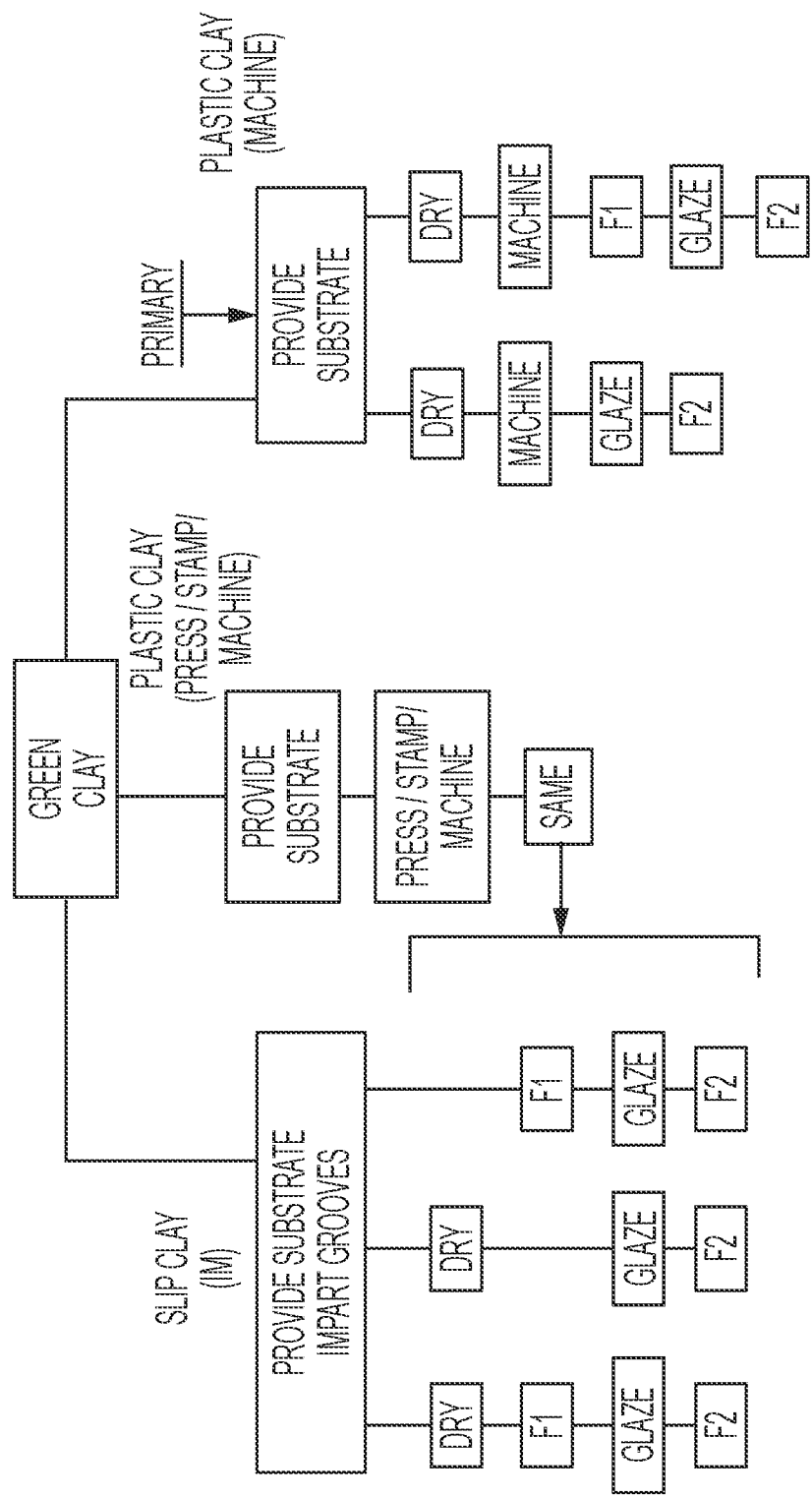
FIG. 11 is a flowchart showing the various process steps discussed herein.

FIG. 11 is a flowchart showing the steps of the different processes discussed herein.

Although the invention has been described in detail for the purpose of illustration based on what are currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that the present invention contemplates that to the extent possible, one or more features of any embodiment can be combined with one or more features of any other embodiment.

The invention claimed is:
1. A method of manufacturing a glazed ceramic tile with at least one groove to receive grout to replicate the appearance of multiple tiles comprising the steps of:
   a) initially, providing a substrate of green clay wherein the substrate has a first surface that is flat and planar, an opposing second surface, and a depth between the first surface and the second surface;

b) after the step of a), but before the step of c), drying the green clay to remove moisture from the substrate;

c) after the step of b), but before the step of d), imparting at least one groove within the second surface of the substrate in the green state, wherein the groove has a depth that is between 50-67% of the depth of the substrate;

d) after the step of c), but before the step of e), applying a layer of glaze upon the second surface; and e) after the step of d), glaze firing the substrate wherein the substrate is vitrified into ceramic and the glaze is melted onto the second surface of the substrate.

2. A method of manufacturing a glazed ceramic tile with at least one groove to receive grout to replicate the appearance of multiple tiles comprising the steps of:

a) initially, providing a substrate of clay wherein the substrate has a first surface that is flat and planar, an opposing second surface, and a depth between the first surface and the second surface;

b) after the step of a), but before the step of c), drying the green clay to remove moisture from the substrate;

c) after the step of b), but before the step of d), imparting at least one groove within the second surface of the substrate in the green state by machining the substrate to produce at least one groove, wherein the groove has a depth that is between 50-67% of the depth of the substrate;

d) after the step of c), but before the step of e), applying a layer of glaze over the second surface; and e) after the step of d), glaze firing the substrate with the glaze thereupon wherein the substrate is vitrified into ceramic and the glaze is melted onto the second surface of the substrate.

3. The method according to claim 2, wherein the substrate has a width and at least one groove extends across the entire width of the substrate.

4. The method according to claim 2, wherein the substrate has a perimeter and at least one groove extends only partially across the width of the perimeter.

5. The method according to claim 2, wherein at least one groove is spaced from the perimeter and does not extend to the perimeter.

6. The method according to claim 5, wherein at least one groove is circular.

7. A method of manufacturing a glazed ceramic tile with at least one groove to receive grout to replicate the appearance of multiple tiles comprising the steps of:

a) initially, providing a substrate of green clay wherein the substrate has a first surface that is flat and planar, an opposing second surface, and a depth between the first surface and the second surface;

b) after the step of a), but before the step of c), drying the green clay to remove moisture from the substrate;

c) after the step of b), but before the step of d), imparting at least one groove within the second surface of the substrate in the green state, wherein the groove has a depth that is between 50-67% of the depth of the substrate;

d) after the step of c), but before the step of e), applying a layer of glaze over the second surface; and e) after the step of d), glaze firing the substrate with the glaze thereupon to a temperature above 1800° F. wherein the substrate is vitrified into ceramic and the glaze is melted onto the second surface of the substrate.

8. The method according to claim 7, wherein at least one groove is imparted by machining.

9. The method according to claim 7, wherein the substrate has a width and at least one groove extends across the entire width of the substrate.

10. The method according to claim 7, wherein the substrate has a perimeter and at least one groove extends only partially across the width of the perimeter.

11. The method according to claim 7, wherein at least one groove is spaced from the perimeter and does not extend to the perimeter.

12. The method according to claim 11, wherein at least one groove is circular.

* * * * *